Patented July 9, 1940

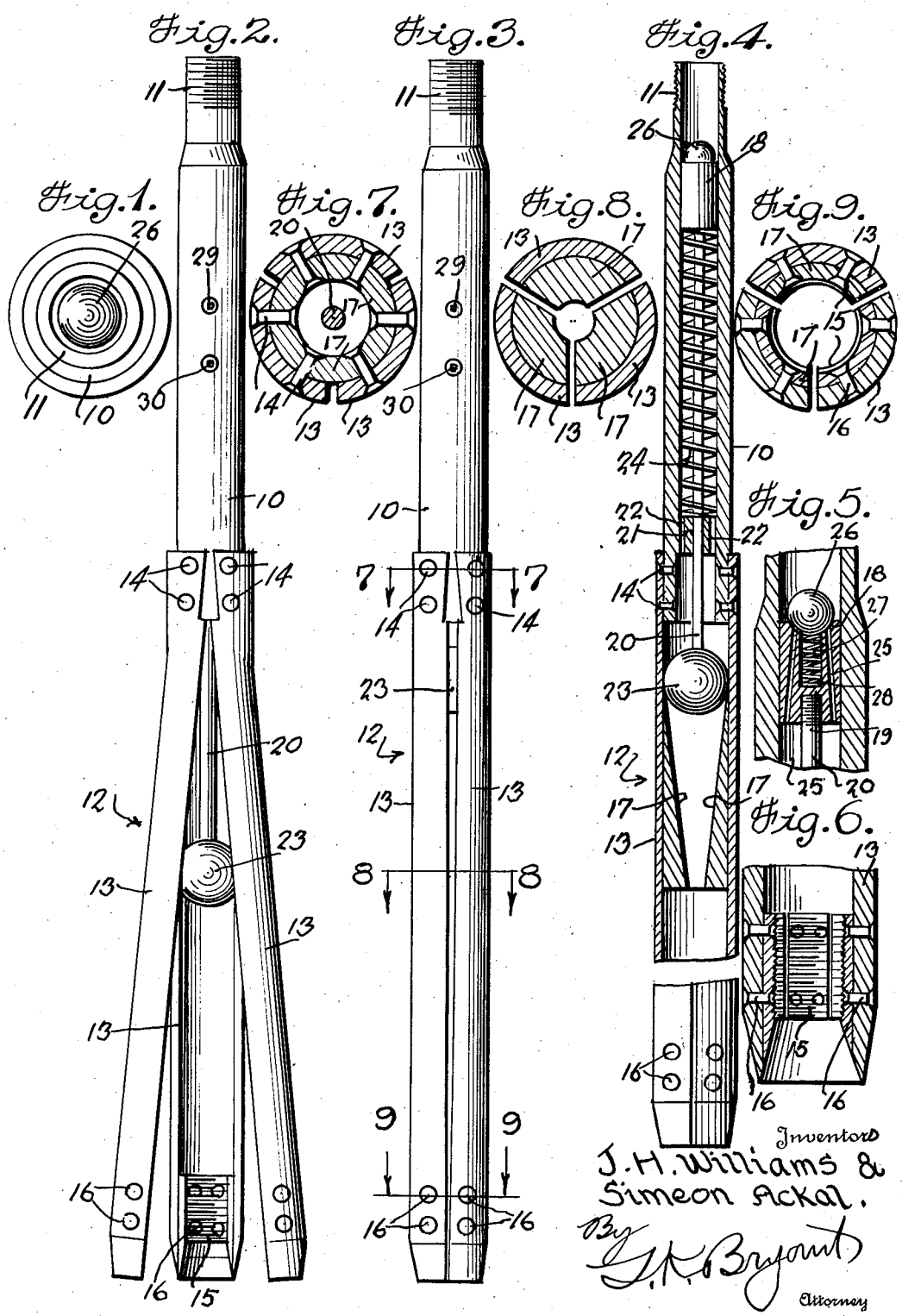

2,207,649

UNITED STATES PATENT OFFICE 2,207,649

OIL WELL FISHING TOOL

John Huey Williams and Simeon Ackal, New Iberia, La.

Application September 8, 1939, Serial No. 294,022

6 Claims. (Cl. 294—88)

This invention relates to certain new and useful improvements in oil well fishing tool.

The primary object of the invention is to provide an oil well fishing tool for the removal of a regular string of pipes from an oil well as well as fishing from the well scrap such as pieces of iron or the like that frequently fall into the well.

A further object of the invention is to provide a fishing tool of the foregoing character embodying a plurality of resilient gripping jaws normally retained in cylindrical or pipe formation with died thread blocks carried by the ends of the jaws for threaded engagement with a regular string of pipes or for gripping engagement with pieces of iron or the like to be fished from the well with pressure operated means for opening the jaws different distances.

With the above and other objects in view that will become apparent as the nature of the invention is better understood, the same consists in the novel form, combination and arrangement of parts hereinafter more fully described, shown in the accompanying drawing and claimed.

In the drawing:

Figure 1 is a top plan view of an oil well fishing tool constructed in accordance with the present invention;

Figure 2 is a side elevational view showing the gripping jaws of the tool in their opened position;

Figure 3 is a side elevational view showing the gripping jaws in their closed position;

Figure 4 is a vertical longitudinal sectional view, partly broken away, showing the pressure operated tensioned piston for the operation of the gripping jaws of the fishing tool;

Figure 5 is an enlarged detail sectional view showing the pressure operated piston with the ball valve in position thereon;

Figure 6 is an enlarged detail sectional view showing the die gripping jaws of the tool;

Figure 7 is a cross-sectional view taken on line 7—7 of Figure 3;

Figure 8 is a cross-sectional view taken on line 8—8 of Figure 3, showing the cam blocks within the gripping jaws; and Figure 9 is a cross-sectional view taken on line 9—9 of Figure 3.

Referring more in detail to the accompanying drawing, the oil well fishing tool is illustrated as comprising a cylinder 10 having a reduced externally threaded upper end 11 to which a fishing rod pipe is connected. A work gripping head designated in general by the reference character 12 is connected to the lower end of the cylinder 10 and includes a series of elongated gripping jaws 13, preferably three in number and combinedly forming a cylinder as illustrated by Figures 7, 8 and 9, the gripping jaws 13 being resilient and anchored at their upper ends as at 14 exteriorly of the lower end of the cylinder 10.

The lower end of each gripping jaw 13 has a died thread block 15 of arcuate formation secured to the inner face thereof by means of rivets 16 or the like, the several died thread blocks 15 when the gripping jaws 13 are in their closed position as shown in Figure 3, presenting a continuous screw thread for threaded engagement with a regular string of pipes or for gripping or biting engagement with scrap material such as small pieces of iron or the like. A cam block 17 is secured to the inner face of each gripping jaw 13 with the operative face thereof inclined outwardly toward the upper end of the jaw as shown in Figure 4.

Fluid operated devices are provided for separating or swinging outwardly the lower ends of the gripping jaws 13 against inherent resiliency thereof and said devices include a piston 18 slidably mounted in the cylinder 10, the lower end of the piston 18 having the threaded upper end 19 of a piston rod 20 anchored therein as shown in Figure 5. The piston rod 20 extends downwardly through the cylinder 10 into the upper end of the gripping jaws 13 above the cam blocks 17, the piston rod 20 slidably passing through a block 21 mounted in the lower end of the cylinder 10 as shown in Figure 4, the block 21 having oppositely disposed longitudinal ported openings extending therethrough. A ball head 23 is carried by the lower end of the piston rod 20 and is of a diameter substantially equal to the internal diameter of the upper ends of the gripping jaws 13. The piston 18 is normally maintained at its limit of upward movement by means of a coil spring 24 surrounding the piston rod 20 and bearing at opposite ends respectively on the bottom face of the piston 18 and the upper face of the block 21. As shown in Figure 5, the piston 18 has a pair of oppositely disposed longitudinally extending ported openings 25 that are adapted to be closed by a ball valve, the latter being moved to its closed position in a manner to be presently described, against the tension of the coil spring 27 mounted in the upwardly opening socket 28 provided in the piston 18. As shown in Figures 2 and 3, the cylinder 10 is provided in a side wall thereof with a pair of vertically spaced openings selectively closable by closure plugs 29 and 30, for purposes presently to appear.

The fishing tool is placed in the well with the ball valve 26 removed, the coil spring 24 holding the piston 18 at its limit of upward movement with the ball head 23 upon the lower end of the piston rod 20 disposed above the upper ends of the cam blocks 17, the gripping jaws 13 of the work gripping head being contracted by inherent resiliency thereof into the position shown in Figures 3 and 4. Should it be desired to expand the lower ends of the gripping jaws 13, the minimum separating distance, for instance 10 inches, the upper screw plug 29 is removed from the upper side opening in the cylinder 10, but should it be desired to expand the lower ends of the gripping jaws to their maximum separating position, the lower screw plug 30 is removed from the cylinder 10 and the upper plug 29 allowed to remain in position. Fluid is flowed downwardly through the fishing tool for passage through the ported openings 25 in the piston 18 for escape through either of the opened side openings in the cylinder 10 for circulating mud or fluid in the well to get the mud or fluid into proper condition for the successful operation of the fishing tool. The ball valve 26 is then dropped into the fishing tool and is held off of the upper ends of the ported openings 25 by means of the spring 27. Fluid pressure is then introduced into the pipe line of the fishing tool and into the upper end of the cylinder 10 which closes the ball valve 26 on its seat and lowers the piston 18 against the tension of the spring 24, the ball head 23 on the lower end of the piston rod 22 moving into contact with the cam blocks 13 for separating the lower ends of the resilient gripping jaws 13, the jaws being separated a distance controlled by the positioning of the openings closed by the screw plugs 29 and 30 in the cylinder 10. When the upper end of the piston 18 moves below the upper openings in the cylinder 10, pressure of the operating fluid is relieved by the escape or passage of the fluid through said opening and the gripping jaws are maintained in their separated condition until the object in the well sought thereby has been contacted. Thereafter, pressure in the fishing line is relieved, the spring 24 then moving the piston 18 upwardly to displace the ball head 23 of the piston rod with respect to the cam blocks 13 with the resiliency of the gripping jaws 13 moving them into gripping engagement with the object contacted thereby.

From the above detailed description of the invention, it is believed that the construction and operation thereof will at once be apparent, and while there is herein shown and described the preferred embodiment of the invention, it is nevertheless to be understood that minor changes may be made therein without departing from the spirit and scope of the invention as claimed.

We claim:

1. In a fishing tool for oil wells, a cylinder, resilient gripping jaws depending from the cylinder, means carried by the cylinder and adapted to be operated for expanding the gripping jaws against inherent resiliency thereof and means for controlling operation of the aforesaid means whereby said aforesaid means may be operated for expanding the gripping jaws different distances.

2. In a fishing tool for oil wells, a cylinder, resilient gripping jaws depending from the cylinder, means carried by the cylinder and adapted to be operated for expanding the gripping jaws against inherent resiliency thereof and means for controlling operation of the aforesaid means whereby said aforesaid means may be operated for expanding the gripping jaws different distances, said first-named means including a fluid operated piston and cooperating means carried by said piston and gripping jaws to effect expanding movement of said gripping jaws upon movement of said piston.

3. In a fishing tool for oil wells, a cylinder, resilient gripping jaws depending from the cylinder, means carried by the cylinder and adapted to be operated for expanding the gripping jaws against inherent resiliency thereof and means for controlling operation of the aforesaid means whereby said aforesaid means may be operated for expanding the gripping jaws different distances and died thread blocks carried by the inner faces of the lower ends of said gripping jaws.

4. In a fishing tool for oil wells, a cylinder, resilient gripping jaws depending from the cylinder, means carried by the cylinder and adapted to be operated for expanding the gripping jaws against inherent resiliency thereof and means for controlling operation of the aforesaid means whereby said aforesaid means may be operated for expanding the gripping jaws different distances, said first-named means including a fluid operated piston and cooperating means carried by said piston and gripping jaws to effect expanding movement of said gripping jaws upon movement of said piston and died thread blocks carried by the inner faces of the lower ends of said gripping jaws.

5. In a fishing tool for oil wells, a cylinder, resilient gripping jaws depending from the lower end of the cylinder, said cylinder having a pair of vertically spaced openings therein adapted to be closed by plugs, a piston reciprocable in said cylinder, an abutment at the lower end of the cylinder, a rod carried by the piston and extending downwardly for slidable passage through said abutment with a head upon its lower end disposed within the upper ends of the gripping jaws, a coil spring surrounding the piston rod between the abutment and piston and operative for normally holding the piston at its limit of upward movement, cam blocks on the inner faces of the jaws adapted to be engaged by the head on the lower end of the piston rod for expanding the jaws during lowering movement of the piston, said piston having opening therethrough whereby fluid may flow through said openings and out of the cylinder through one of said openings and a ball valve adapted to be inserted at the upper end of the cylinder to close the piston openings whereby fluid pressure above the piston will move the piston downwardly to uncover one of said cylinder openings for the lateral escape of pressure fluid and thereby limit downward movement of said piston and corresponding expanding movements of said gripping jaws.

6. In a fishing tool for oil wells, a cylinder, resilient gripping jaws depending from the lower end of the cylinder, said cylinder having a pair of vertically spaced openings therein adapted to be closed by plugs, a piston reciprocable in said cylinder, an abutment at the lower end of the cylinder, a rod carried by the piston and extending downwardly for slidable passage through said abutment with a head upon its lower end disposed within the upper ends of the gripping jaws, a coil spring surrounding the piston rod between the abutment and piston and operative for normally holding the piston at its limit of upward movement, cam blocks on the inner faces of the jaws adapted to be engaged by the head on the lower end of the piston rod for expanding the jaws during lowering movement of the piston, said piston having openings therethrough whereby fluid may flow through said openings and out of the cylinder through one of said openings, a ball valve adapted to be inserted at the upper end of the cylinder to close the piston openings whereby fluid pressure above the piston will move the piston downwardly to uncover one of said cylinder openings for the lateral escape of pressure fluid and thereby limit downward movement of said piston and corresponding expanding movements of said gripping jaws and a spring carried by said piston for normally unseating said ball valve in the absence of fluid pressure above the piston whereby fluid may flow through the valve openings and out of one of the openings in the cylinder.

JOHN HUEY WILLIAMS.

SIMEON X ACKAL.
his   mark

Witnesses to mark of Simeon Ackal:
S. O. LANDRY,
ANITA M. LANDRY.